UNITED STATES PATENT OFFICE.

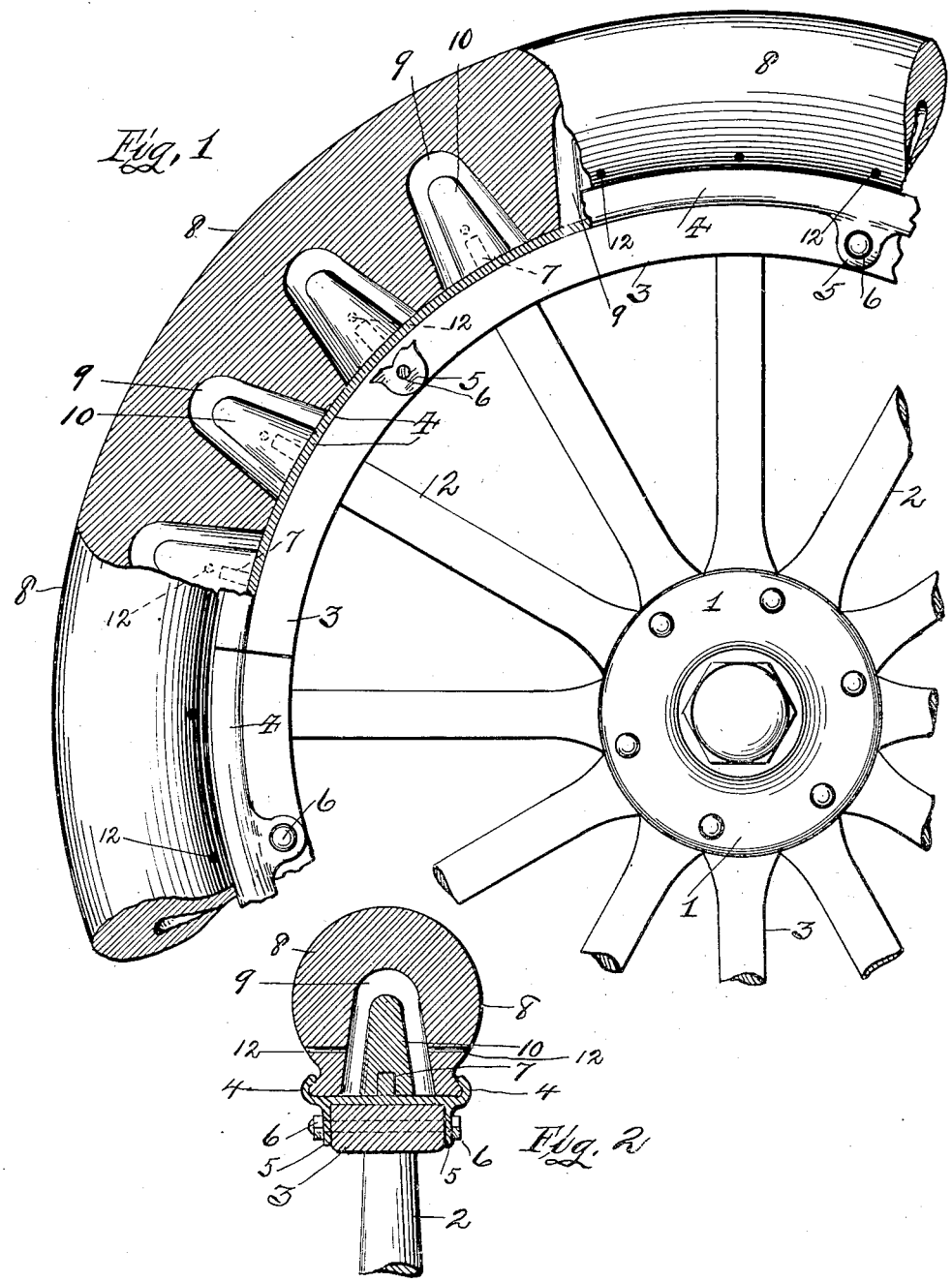

THOMAS C. WATKINS, OF INGRAM, PENNSYLVANIA, ASSIGNOR OF ONE-THIRD TO THEODORE A. SPRAGUE, OF BELLEVUE, PENNSYLVANIA, AND ONE-THIRD TO CHARLES M. McFARLAND, OF INGRAM, PENNSYLVANIA.

VEHICLE-TIRE.

1,251,717.     Specification of Letters Patent.     Patented Jan. 1, 1918.

Application filed September 13, 1915, Serial No. 50,301. Renewed March 31, 1917. Serial No. 158,880½.

*To all whom it may concern:*

Be it known that I, THOMAS C. WATKINS, a citizen of the United States, residing at Ingram, in the county of Allegheny and State of Pennsylvania, have invented certain new and useful Improvements in Vehicle-Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in vehicle tires, and more particularly to that class of tires used with automobile wheels and known in the art as "cushion" tires, and the invention consists in forming within the body of the tire and at regular intervals, a series of compartments to give the tire the proper resilience and with vent openings for air circulation, also each compartment with a rubber core to give support to the tread portion, the said supports being formed from rubber having a greater coefficient of elasticity than that of the tread of the tire, and the invention further consists of the certain details of construction and combination of parts, as will be fully described hereinafter.

In the accompanying drawings:—

Figure 1 is a side elevation, partly in section, of a vehicle wheel showing my improved tire, the same being constructed and arranged in accordance with my invention.

Fig. 2 is a cross section of the same, said section being taken through one of the compartments.

To construct a vehicle tire in accordance with my invention and adapt the same for automobile and other uses, said wheel comprising a hub 1, spokes 2, and felly 3, such as are now in common use, I attach to the said felly 3, by means of transversely-arranged bolts 6, a tire holder consisting of a channel 4, bent in the form of a circle and provided with lugs 5, attached to its inner periphery, which together with the flanges of the channel 4, affords a means for holding the tire 8, securely in position. This tire holder is preferably made in two or more sections, each having radially-projecting pins 7, located with respect to the compartments 9, formed in the body of the tire, said pins being adapted with the aid of suitable cement to hold or keep the blocks 10, in the proper position. The tire comprises a cylindrical piece of rubber in circular form (8) and formed with a series of compartments 9, opening toward the inner periphery, and preferably conical in form, but may be of any suitable shape. Each of the compartments 9, is provided with a conical block or core of rubber 10, centrally located within the compartment and of less size, leaving a surrounding space for the free circulation of air. These blocks 10 are made of rubber having a greater coefficient of elasticity than that of the tire 8, and answer the purpose of supporting springs when the tire is taxed beyond its ordinary carrying capacity and may be attached or held in the proper position either by above described pins 7, or by any suitable means. Each of the compartments 9, is provided with one or more air passages 12, arranged in a horizontal position and leading to the outside of the tire 8.

The above-described tire when in use will give the proper resiliency necessary for the wheels of motor-driven vehicles, such as automobiles, auto trucks, &c., and it is well known that when this class of tires are in use they acquire a high temperature. This temperature is effectfully overcome by this construction of tire, as the wheel when in motion, by reason of its load and the compression or partial collapse of the compartments the air will be discharged and replaced in quick succession by reason of the elastic nature of the rubber construction, the heated air passing out and cold air drawn in, thereby forming what may be termed an "air cooled" tire.

Having thus described my invention, what I claim, is;—

1. A vehicle tire comprising an annular body formed from rubber, a holder for attaching the same to the felly of the wheel, a series of compartments formed within the said body and open toward the inner periphery, vent openings leading to each of said compartments, a rubber block within each compartment arranged to leave a surrounding air space, said blocks formed from a rubber having a greater coefficient of elasticity than that of the body, and a means for attaching said blocks rigidly in position on the periphery of the tire holder.

2. A vehicle tire comprising an annular body formed from rubber, a holder for attaching the same to the felly of the wheel, a series of compartments formed within the said body and open toward the inner periphery, vent openings leading to each of said compartments, a rubber block within each compartment arranged to leave a surrounding air space, said blocks formed from a rubber having a greater coefficient or ratio of elasticity than that of the body, and a means for attaching said blocks in position and centrally located within said compartments.

In testimony whereof, I affix my signature, in presence of two witnesses.

THOMAS C. WATKINS.

Witnesses:
M. E. HARRISON,
C. C. LEE.